United States Patent
Neitz et al.

(10) Patent No.: US 11,673,482 B2
(45) Date of Patent: Jun. 13, 2023

(54) METHOD AND CHARGING DEVICE FOR CHARGING A HIGH-VOLTAGE BATTERY OF AN ELECTRIC VEHICLE

(71) Applicants: PREH GMBH, Bad Neustadt A. D. Saale (DE); BRUSA ELEKTRONIK AG, Sennwald (CH)

(72) Inventors: Marc Neitz, Oberelsbach (DE); Alexander Matthias, Kaltennordheim (DE); Axel Krause, Nesslau (CH); Andreas Kruspan, Grabs (CH); Marc Hanselmann, Fruemsen (CH); Hannes Hobi, Sargans (CH); Rudolf Meusburger, Bezau (AT)

(73) Assignees: PREH GMBH, Bad Neustadt A.D. Saale (DE); BRUSA ELEKTRONIK AG, Sennwald (CH)

(*) Notice: Subject to any disclaimer, the term of this patent is extended or adjusted under 35 U.S.C. 154(b) by 294 days.

(21) Appl. No.: 17/126,056

(22) Filed: Dec. 18, 2020

(65) Prior Publication Data
US 2021/0101501 A1   Apr. 8, 2021

(51) Int. Cl.
B60L 53/62   (2019.01)
H02J 7/00   (2006.01)
B60L 53/16   (2019.01)

(52) U.S. Cl.
CPC .............. *B60L 53/62* (2019.02); *B60L 53/16* (2019.02); *H02J 7/007* (2013.01); *H02J 7/0031* (2013.01); *H02J 2207/20* (2020.01)

(58) Field of Classification Search
CPC ... B60L 53/62; B60L 53/16; H02J 7/00; H02J 7/007; H02J 7/0031; H02J 2207/20

USPC .......................................................... 320/109
See application file for complete search history.

(56) References Cited

U.S. PATENT DOCUMENTS

| | | | |
|---|---|---|---|
| 8,964,339 B2* | 2/2015 | Li ......................... | H02H 11/001 |
| | | | 361/42 |
| 10,513,185 B2* | 12/2019 | Elshaer ................... | B60L 53/22 |
| 11,135,932 B2* | 10/2021 | Ishida ..................... | B60L 53/16 |
| 11,447,031 B2* | 9/2022 | Lim ................... | G01R 19/16542 |
| 2013/0057200 A1 | 3/2013 | Potts et al. | |
| 2013/0258531 A1 | 10/2013 | Li et al. | |
| 2018/0043789 A1 | 2/2018 | Goetz | |
| 2019/0064279 A1* | 2/2019 | Dan ..................... | G01R 31/389 |
| 2019/0359073 A1 | 11/2019 | Song et al. | |

(Continued)

FOREIGN PATENT DOCUMENTS

| | | | |
|---|---|---|---|
| CN | 206020596 U | * | 3/2017 |
| DE | 102018006810 A1 | * | 2/2019 |

(Continued)

*Primary Examiner* — M Baye Diao
(74) *Attorney, Agent, or Firm* — Norman B. Thot (57) ABSTRACT

A method for charging a high-voltage battery of an electric vehicle, comprising: providing the high-voltage battery having a nominal battery voltage; providing a charging station outputting a DC charging voltage less than the nominal battery voltage; draining current between a first battery terminal and a protective earth terminal such that the voltage between the first battery terminal and the protective earth terminal essentially matches with the voltage between a first charging terminal and the protective earth terminal, and boosting the voltage at a second charging terminal of the charging station to match the charging voltage with the nominal battery voltage.

24 Claims, 6 Drawing Sheets

(56) References Cited

U.S. PATENT DOCUMENTS

2020/0225275 A1\* 7/2020 Du ....................... G01R 31/006
2020/0276908 A1    9/2020 Lim
2021/0039520 A1\* 2/2021 Jin ......................... G01R 31/52

FOREIGN PATENT DOCUMENTS

| DE | 102017218586 A1 \* | 4/2019 | |
|----|---|---|---|
| EP | 2 645 512 A1 | 10/2013 | |
| EP | 3 699 013 A2 | 8/2020 | |
| EP | 3744557 A1 \* | 12/2020 | ................ B60L 3/04 |
| ES | 2793649 T3 \* | 11/2020 | ....... G01R 19/16542 |
| WO | WO 2016/174117 A1 | 11/2016 | |

\* cited by examiner

METHOD AND CHARGING DEVICE FOR CHARGING A HIGH-VOLTAGE BATTERY OF AN ELECTRIC VEHICLE

FIELD OF THE INVENTION

The invention relates to a method as well as a charging device each for charging a high-voltage battery, and particularly to a method and a charging device each for charging a high-voltage battery of an electric vehicle (EV) such as a hybrid electric vehicle (HEV) or a battery electric vehicle (BEV).

BACKGROUND OF THE INVENTION

For safety reasons in high-voltage networks, it is known to use insulation monitoring devices or so-called "ISO guards" for measuring the insulation resistance between PE (protective earth) and high-voltage cables. If the insulation resistance is too low a safety mechanism would interrupt the power transfer by opening a switch, relay and the like, for example.

When an electric vehicle having a high-voltage battery, for example a battery having a nominal voltage of 800 V, is charged at a charging station that provides a lower charging voltage than the nominal battery voltage, i.e., in the given example, lower than 800 V, e.g. a charging voltage of 400 V, it is also common to use a DC/DC boost converter to convert the voltage provided by the charging station to match with the nominal voltage of the high-voltage battery of the electric vehicle.

Depending on the topology, this may lead to an asymmetry, i.e. a shift of electrical potential, between the high-voltage side and protective earth (PE). In consequence, the valid range of an insulation voltage may be exceeded. Furthermore, an ISO guard would calculate a wrong insulation resistance. The ISO guard which monitors the proper insulation resistance between protective earth (PE) and the high-voltage (HV) side interprets a high current increase due to the asymmetry as a faulty insulation resistance and would stop the charging process instantly. Thus, electric vehicles such as HEVs and BEVs with high-voltage batteries having a higher nominal battery voltage than provided by a charging station cannot be charged, or at least cannot be reliably charged, at such charging stations.

Accordingly, what is needed are a method as well as a charging device each being capable to charge a high-voltage battery of an electric vehicle at a charging station which provides a lower charging voltage than the nominal voltage of the high-voltage battery, along with improved performance, where performance is assessed on the qualities of reliability, safety of operation, efficiency, flexibility, as well as manufacturing ease and cost.

SUMMARY OF THE INVENTION

It is an object of the present invention to provide a method for charging a high-voltage battery of an electric vehicle, and a charging device for charging a high-voltage battery of an electric vehicle, and an electric vehicle having a high-voltage battery, which facilitate reliable, safe, and efficient charging of the high-voltage battery at charging stations providing charging voltages lower than the nominal voltage of the high-voltage battery, thus significantly increasing the possibilities of charging the electric vehicle at many different charging stations.

The invention is defined by the independent claims. The dependent claims define advantageous embodiments.

It is to be noted that the individual features listed in the description below can be combined in any technically meaningful way with each other (also across different categories, such as, e.g., apparatus and method categories) and show further embodiments of the invention. The description of the invention is additionally characterized and specified particularly in connection with the figures.

Furthermore, it is to be understood that the term "and/or" or the expressions "at least one of" or "one or more of", if used herein in order to combine a first and a second feature, are to be construed as disclosing a first embodiment of the invention that comprises only the first feature, a second embodiment of the invention that comprises only the second feature, and a third embodiment of the invention that comprises both the first feature and the second feature. If more than two features are listed, also any combinations thereof are to be construed as disclosed embodiments according to the invention.

Still further, the term "approximately" or "essentially" indicates a range of tolerance which the skilled person in the field in question considers to be normal. In particular, the term "approximately" or "essentially" is to be understood as a tolerance range of the referred quantity of up to a maximum of +/−20%, preferably up to a maximum of +/−10%.

According to a first aspect, a method for charging a high-voltage battery of an electric vehicle (e.g. a hybrid electric vehicle (HEV) or a battery electric vehicle (BEV), wherein, without being limited thereto, the high-voltage battery may be a traction battery of the vehicle), comprises the steps: providing the high-voltage battery having a nominal battery voltage (e.g. 800 V) between first and second battery terminals; providing a charging station outputting a DC charging voltage between first and second charging terminals, wherein the DC charging voltage (e.g. 400 V) is less than the nominal battery voltage of the high-voltage battery; electrically connecting a charging station-side protective earth terminal to a battery-side (or vehicle-side) protective earth terminal so as to share a common protective earth (PE); and electrically connecting the first and second charging terminals to the respective first and second battery terminals while (i) draining current between the first battery terminal and the protective earth terminal such that the DC voltage between the first battery terminal and the protective earth terminal essentially matches with the DC voltage between the first charging terminal and the protective earth terminal, and (ii) boosting the voltage at the second charging terminal to match the DC charging voltage of the charging station (e.g. 400 V) with the nominal battery voltage of the high-voltage battery (e.g. 800 V), and feeding the boosted DC voltage to the second battery terminal.

Boosting the voltage may be accomplished by means of a DC/DC boost converter (also referred to as a DC/DC step-up converter), for example, which is configured to provide the respective voltage boost between its input and output terminals, wherein the input terminal is connected to the second charging terminal of the charging station, and the output terminal provides the boosted DC voltage to be fed to the second battery terminal of the high-voltage battery when charging the high-voltage battery.

It is particularly advantageous that only one single DC/DC boost converter is required for this purpose, however, without necessarily being limited to just one converter.

The combination of draining the current on the one hand and boosting the voltage on the other establishes a PE symmetry in spite of the difference in voltages between the charging station and the high-voltage battery. Hence, a slow rise of the charging current can be ensured after electrically connecting the high-voltage battery to the charging station and starting the charging procedure.

As mentioned herein, for safety reasons, in high-voltage networks such as the network temporarily formed by the charging station and the high-voltage battery of the vehicle for charging the battery, it is common to use insulation monitoring devices or so-called "ISO guards" for continuously measuring the insulation resistance between PE (protective earth) and the high-voltage cables transferring the electric charging power from the first and second charging terminals to the respective first and second battery terminals. Then, if the determined insulation resistance drops below a resistance threshold, a safety mechanism is triggered to immediately interrupt the power transfer by opening a switch, relay, and the like, for example.

In the present case, when the high-voltage battery having a nominal battery voltage (e.g. 800 V) is charged at a charging station that provides a lower charging voltage (e.g. 400 V) than the nominal battery voltage of the battery, the DC/DC boost converter is used to step-up the voltage provided by the charging station to comply/match with the nominal voltage of the high-voltage battery of the electric vehicle. However, without draining the current according to the invention as described herein, this may lead to an asymmetry, i.e. a shift of electrical potential, between the high-voltage side and protective earth (PE). In consequence, firstly, this shift may cause an insulation voltage to be exceeded. Secondly, the insulation monitoring device such as the ISO guard will determine/calculate a wrong insulation resistance due to high current transients after electrically connecting the battery to the charging station and starting the charging procedure. The ISO guard which monitors the proper insulation resistance between protective earth (PE) and the high-voltage (HV) side interprets the high current increase as a faulty insulation resistance and will stop the charging process instantly. Thus, electric vehicles such as HEVs and BEVs with high-voltage batteries cannot be charged, or at least cannot be reliably charged, at charging stations providing a lower charging voltage than the nominal battery voltage.

The invention effectively overcomes this drawback as disclosed herein. Consequently, reliable, safe, and efficient charging of the high-voltage battery at charging stations providing charging voltages lower than the nominal voltage of high-voltage batteries is facilitated by the invention, thus further significantly increasing the possibilities of charging electric vehicles at many different charging stations worldwide.

According to advantageous embodiments, draining the current comprises operating a transistor in its linear operation mode (i.e. without driving it into saturation) as a current drain. In this way, a possible PE asymmetry will be compensated by the linearly driven transistor draining current between the high-voltage side and PE.

Additionally, transistor devices which can drain high currents are commonly available on the market. Therefore, the current drain may be implemented advantageously with manufacturing ease and low cost. Particularly, the current drain may be embodied as hardware only enabling fast and accurate analog control of the current to be drained at particular operation/charging phases. Thus, a possible interruption of the charging operation caused by an insulation monitoring device (e.g. ISO guard) calculating a "wrong" insulation resistance is reliably prevented during the transient activation operation, particularly, immediately after starting the charging operation of the battery.

Furthermore, draining the current may comprise conducting the drained current through a resistance network, i.e. an interconnection of several resistors. In other words, if a transistor is used as the current drain device, the transistor may be connected in series with the resistance network to limit the drained current efficiently and flexibly in an appropriate and desired manner.

According to other advantageous embodiments, draining the current may be selectively interrupted galvanically. To this end, the current drain device may optionally be galvanically isolated from the high-voltage side, i.e. the first battery voltage terminal. The selective galvanic interruption may be embodied by a controllable switch, relay, and the like, connected in series with the current drain device.

Still according to further advantageous embodiments, draining the current may be conducted by an analog current control loop which is controlled by a setpoint current signal provided by a voltage control loop, wherein a process value to be controlled by the voltage control loop is a voltage difference between the voltage between the first battery terminal and the protective earth terminal and the voltage between the first charging terminal and the protective earth terminal.

Preferably, the analog current control loop may be embodied in hardware only, for example, comprising a transistor device as the current drain device as described herein being controlled, e.g. via an operational amplifier, by the setpoint current signal provided as a function of the voltage control loop.

In any case, according to this embodiment, the PE symmetry is established with a fast constant current feedback control provided by the current control loop which, in turn, is complemented by the voltage control loop possibly operating at a lower dynamic/speed than the current control loop.

Furthermore, the afore-mentioned voltage difference may be controlled by the voltage control loop to be essentially zero, thus minimizing the flow of high compensating currents between the high-voltage battery and the charging station when establishing electrical connection therebetween.

Yet according to other advantageous embodiments, the setpoint current signal is provided as a pulse width modulated (PWM) signal. In this way, the current drain may be controlled with the setpoint signal (preferably with the interposition of an operational amplifier) being generated reliably and accurately.

Yet further, the pulse width modulated signal may be generated by means of a digital processing unit, e.g. a microcontroller, microprocessor, and the like, executing instructions of an appropriate piece of software, thus providing a high degree of flexibility for applications with different requirements.

Still other advantageous embodiments provide that the voltage control loop is implemented by a digital processing unit, such as a microcontroller, microprocessor, and the like, for example. Additionally, the digital processing unit may be also used to generate the afore-mentioned PWM setpoint current signal. Again, a high degree of flexibility for different use cases is ensured as the operation of the voltage control loop is controlled by instructions (i.e. software) executed by the digital processing unit.

According to further preferred embodiments, the voltage control loop is configured to be switchable between a high-dynamic operation mode and a low-dynamic operation mode, wherein the high-dynamic operation mode is preferably selected during a first period of a transient activation operation after electrically connecting the first and second charging terminals to the respective first and second battery terminals, and immediately after starting to charge the battery, and the low-dynamic operation mode is preferably selected after essentially reaching a steady state.

The switching between the high-dynamic operation mode and the low-dynamic operation mode may be selected by operating the voltage control loop with respective predetermined high-dynamic and low-dynamic control parameters. Using the control parameters having the high dynamic characteristic will adjust the desired voltage value between the high-voltage side and PE sufficiently fast during the highly transient activation operation after establishing electrical connection between the charging station and the battery (i.e. in the beginning of charging). After the transient phase has finished, switching to the control parameters having the low dynamic characteristic facilitates reliable and proper continuation of the charging operation as it allows the voltage between the high-voltage side and PE to increase slowly which results from an increase of the battery voltage during charging.

According to other preferred embodiments, an insulation resistance is continuously measured at least between the first battery terminal and the protective earth terminal, and optionally also between the second battery terminal and the protective earth terminal, wherein charging of the high-voltage battery is interrupted (e.g. by opening a switch, relay, and the like) when the measured insulation resistance drops below a predetermined insulation resistance threshold. This ensures safe charging of the high-voltage battery at any time. The measurements may be conducted by an insulation monitoring device such as an ISO guard.

Additionally, according to further preferred embodiments, the measured insulation resistance between the first and/or second battery terminal(s) and the protective earth terminal, may be provided to the voltage control loop by the insulation monitoring device and, consequently, may be used by the voltage control loop to determine the voltage difference to be controlled. Thus, additional voltage sensing means may be omitted.

Furthermore, in still other advantageous embodiments, the voltages between each of the first and second battery terminals and the protective earth terminal are continuously measured on the boosted voltage side (e.g. between a DC/DC boost converter and the respective battery terminals), wherein the setpoint current signal is generated additionally as a function of the measured voltages such that the measured voltages always stay below respectively predetermined insulation-damaging voltage thresholds. In other words, the current drain may be controlled additionally such that the voltages between the high-voltage side(s) and PE, i.e. between each of the first and second battery terminals and PE, will always stay below predetermined critical voltage levels which might cause a damage of the insulation between the high-voltage side(s) and PE.

It is to be understood that further preferred embodiments of the invention can also be any combination of features defined in the dependent claims with the features of the respective independent claim.

According to a second aspect, a charging device for charging a high-voltage battery of an electric vehicle (e.g. a hybrid electric vehicle (HEV) or a battery electric vehicle (BEV), wherein, without being limited thereto, the high-voltage battery may be a traction battery of the vehicle) at a charging station outputting a DC charging voltage between first and second charging terminals, wherein the DC charging voltage (e.g. 400 V) is less than a nominal battery voltage (e.g. 800 V) provided between first and second battery terminals of the high-voltage battery, comprises: first and second power input terminals being electrically connectable to the respective first and second charging terminals of the charging station, wherein the first power input terminal is connected to the first battery terminal, and the second power input terminal is connected to the second battery terminal; a protective earth terminal being electrically connectable to a charging station-side protective earth terminal (common protective earth); a DC/DC boost converter interconnected in series between the second power input terminal and the second battery terminal, the DC/DC boost converter being configured to boost the DC charging voltage to match with the nominal battery voltage; and an electronic control unit configured to control a current drain device to drain current between the first battery terminal and the protective earth terminal, wherein, after the first and second power input terminals have been connected to the respective first and second charging terminals of the charging station, the electronic control unit is configured to drain current such that the DC voltage between the first battery terminal and the protective earth terminal essentially matches with the DC voltage between the first charging terminal and the protective earth terminal while the DC/DC boost converter boosts the voltage.

It is to be noted that, with regard to the effects and advantages of the features regarding the charging device disclosed herein, reference may be made in its entirety to the corresponding, analogous features of the method for charging a high-voltage battery as well as the respective effects and advantages of those features disclosed herein. Therefore, features of the method for charging a high-voltage battery disclosed herein shall be regarded also as features applicable for the definition of embodiments of the charging device for charging a high-voltage battery according to the invention unless explicitly stated otherwise. Likewise, features of the charging device disclosed herein shall be regarded also as features applicable for the definition of embodiments of the method according to the invention unless explicitly stated otherwise. Hence, for the purposes of conciseness of this specification and an improved understanding of the principles of the present invention, a duplication of explanations of these analogous features, their effects and advantages is largely omitted without any such omissions to be construed as limitations.

Preferably, the current drain device may comprise a transistor such as a 1500 V FET, for example, being operated in its linear operation mode (i.e. outside a saturated state thereof).

Furthermore, the charging device may comprise a resistance network (i.e. interconnection of several resistances) connected in series with the current drain device.

According to other advantageous embodiments, the charging device may comprise a controllable switching element, e.g. a switch, relay, and the like, configured to selectively isolate the current drain device from the first battery terminal galvanically. If a resistance network is connected in series with the current drain device, the switching element may be interposed between the current drain device and the resistance network.

In particularly preferred embodiments, the charging device further comprises an analog current control loop controlling the current drain as a function of a setpoint current signal provided by a voltage control loop, wherein a process value to be controlled by the voltage control loop is a voltage difference between the voltage between the first battery terminal and the protective earth terminal and the voltage between the first charging terminal and the protective earth terminal.

Preferably, the analog current control loop may be embodied in hardware only, for example, comprising a transistor device as described herein being controlled, e.g. via an operational amplifier, by the setpoint current signal provided as a function of the voltage control loop.

The voltage control loop may be configured to control the voltage difference to be essentially zero.

According to still further embodiments, the electronic control unit comprises a digital processing unit (e.g. a microcontroller, microprocessor, and the like) configured to generate a pulse width modulated (PWM) signal as the setpoint current signal.

Moreover, the digital processing unit may be configured to implement the voltage control loop.

According to particularly preferred embodiments, the voltage control loop is switchable between a high-dynamic operation mode and a low-dynamic operation mode, wherein the high-dynamic operation mode is selected during a first period of a transient activation operation after electrically connecting the first and second charging terminals to the respective first and second battery terminals, and immediately after starting to charge the battery, and the low-dynamic operation mode is preferably selected after essentially reaching an electrically steady state.

Furthermore, the charging device according to other advantageous embodiments comprises at least one insulation monitoring device (e.g. ISO guard) configured to continuously measure an insulation resistance between the first battery terminal and the protective earth terminal, and optionally also comprises another insulation monitoring device (ISO guard) configured to measure an insulation resistance between the second battery terminal and the protective earth terminal, wherein charging of the high-voltage battery is interrupted when the measured insulation resistance(s) drop(s) below respective predetermined insulation resistance thresholds in order to ensure safe charging of the high-voltage battery at any time.

It is to be understood that further preferred embodiments of the invention can also be any combination of features defined in the dependent claims with the features of the respective independent claim.

According to a third aspect, an electric vehicle having a high-voltage battery (e.g. a hybrid electric vehicle (HEV) or a battery electric vehicle (BEV), wherein, without being limited thereto, the high-voltage battery may be a traction battery of the vehicle), comprises a charging device for charging the high-voltage battery at a charging station outputting a DC charging voltage between first and second charging terminals, wherein the DC charging voltage (e.g. 400 V) is less than a nominal battery voltage (e.g. 800 V) provided between first and second battery terminals of the high-voltage battery, wherein the charging device comprises: first and second power input terminals being electrically connectable to the respective first and second charging terminals of the charging station, wherein the first power input terminal is connected to the first battery terminal, and the second power input terminal is connected to the second battery terminal; a protective earth terminal being electrically connectable to a charging station-side protective earth terminal (common protective earth); a DC/DC boost converter interconnected in series between the second power input terminal and the second battery terminal, the DC/DC boost converter being configured to boost the DC charging voltage to match with the nominal battery voltage; and an electronic control unit configured to control a current drain device to drain current between the first battery terminal and the protective earth terminal, wherein, after the first and second power input terminals have been connected to the respective first and second charging terminals of the charging station, the electronic control unit is configured to drain current such that the DC voltage between the first battery terminal and the protective earth terminal essentially matches with the DC voltage between the first charging terminal and the protective earth terminal while the DC/DC boost converter boosts the voltage.

It is to be noted that, also with regard to the effects and advantages of the features regarding the electric vehicle disclosed herein, reference may be made in its entirety to the corresponding, analogous features of the method and charging device each for charging a high-voltage battery as well as the respective effects and advantages of those features disclosed herein. Therefore, features of the method and charging device each for charging a high-voltage battery disclosed herein shall be regarded also as features applicable for the definition of embodiments of the electric vehicle according to the invention unless explicitly stated otherwise. Likewise, features of the electric vehicle disclosed herein shall be regarded also as features applicable for the definition of embodiments of the method and charging device according to the invention unless explicitly stated otherwise. Hence, for the purposes of conciseness of this specification and an improved understanding of the principles of the present invention, a duplication of explanations of these analogous features, their effects and advantages is largely omitted without any such omissions to be construed as limitations.

It is to be understood that further preferred embodiments of the invention can also be any combination of features defined in the dependent claims with the features of the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings.

In the Figures, like reference signs refer to like objects throughout. Objects in the Figs. are not necessarily drawn to scale.

DETAILED DESCRIPTION OF THE EMBODIMENTS

Various embodiments of the invention will now be described by means of the Figures.

Figure 1:
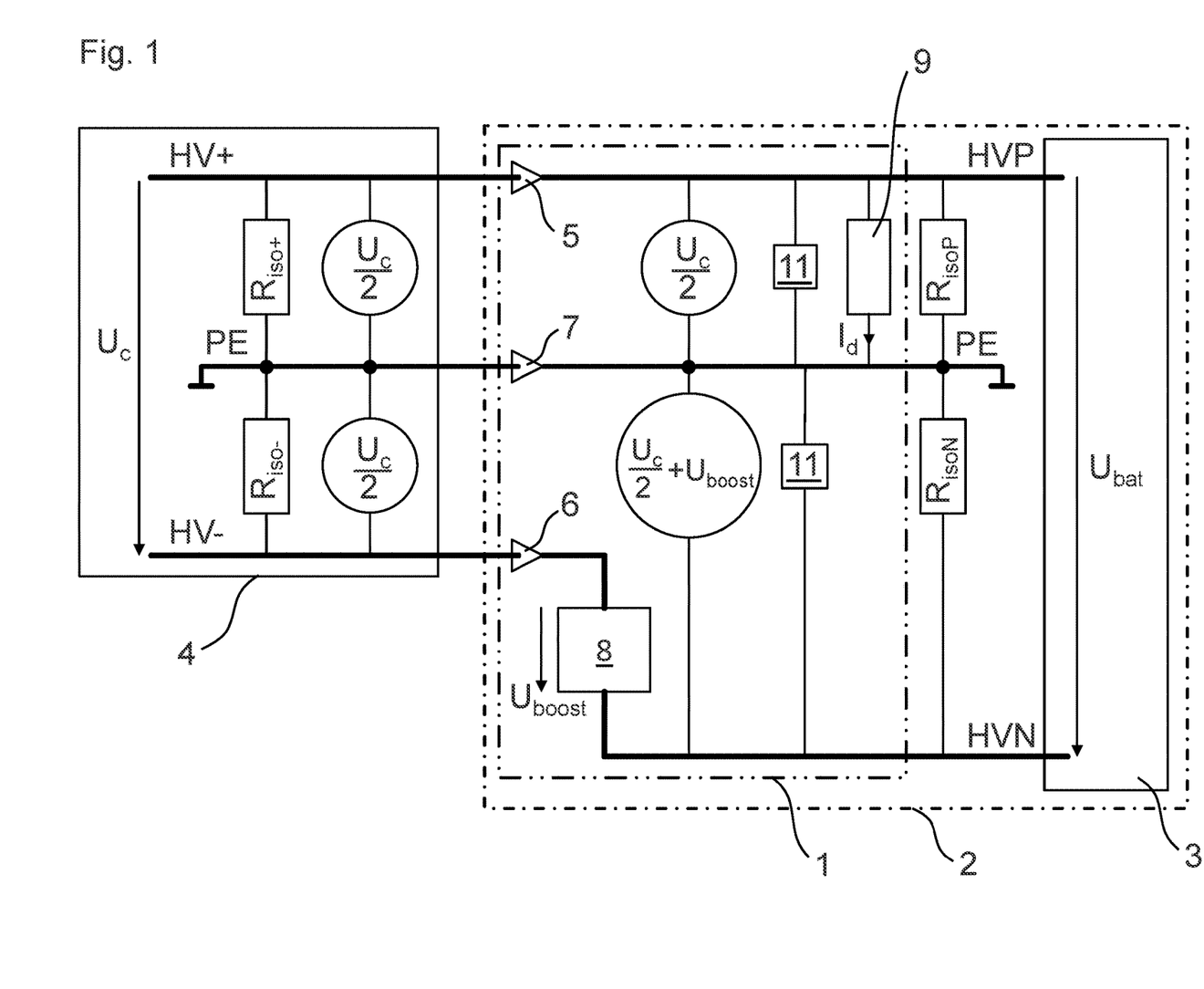
FIG. 1 illustrates a simplified diagram of an exemplary embodiment of a charging device and an electric vehicle each according to the invention during an operation phase of charging a high-voltage battery of the electric vehicle.

FIG. 1 schematically shows a simplified diagram of an exemplary embodiment of a charging device 1 and a schematically depicted electric vehicle 2 (e.g. a HEV or a BEV) each according to the invention, during an operation phase of charging a high-voltage (HV) battery 3 of the electric vehicle 2 at a charging station 4.

In the embodiment shown in FIG. 1, the HV battery 3 has a nominal battery voltage $U_{bat}$ of 800 V (however, without being limited to such a voltage) between a first (positive) battery terminal HVP and a second (negative) battery terminal HVN.

The charging station 4 in the present example outputs a DC charging voltage $U_c$ of 400 V (however, without being limited thereto) between a first (positive) charging terminal HV+ and second (negative) charging terminal HV−. The DC charging voltage $U_c$ (here 400 V) of the charging station 4 is less than the nominal battery voltage $U_{bat}$ (here 800 V) of the high-voltage battery 3.

Further, FIG. 1 shows first and second power input terminals 6, 7 which are electrically connected to the respective first and second charging terminals HV+, HV− of the charging station 4, wherein the first power input terminal 5 is connected to the first battery terminal HVP, and the second power input terminal 6 is connected to the second battery terminal HVN.

Furthermore, the exemplary charging device 1 of FIG. 1 comprises a protective earth terminal 7 which is electrically connected to a charging station-side protective earth terminal PE as shown in FIG. 1, thus forming a common protective earth PE between the charging station 4 and the charging device 1 and/or the electric vehicle 2.

The charging device 1 of FIG. 1 further comprises a DC/DC boost (step-up) converter 8 interconnected in series between the second power input terminal 6 and the second battery terminal HVN. The DC/DC boost converter 8 is configured to boost the DC charging voltage $U_c$ (in the present case 400 V) to match with the nominal battery voltage $U_{bat}$ (in the present case 800 V), i.e., the DC/DC boost converter 8 boosts or steps-up the voltage provided by the charging station 4 by 400 V in the present case, i.e. the step-up voltage $U_{boost}$ is 400 V in the exemplary case shown in FIG. 1.

Figure 5:
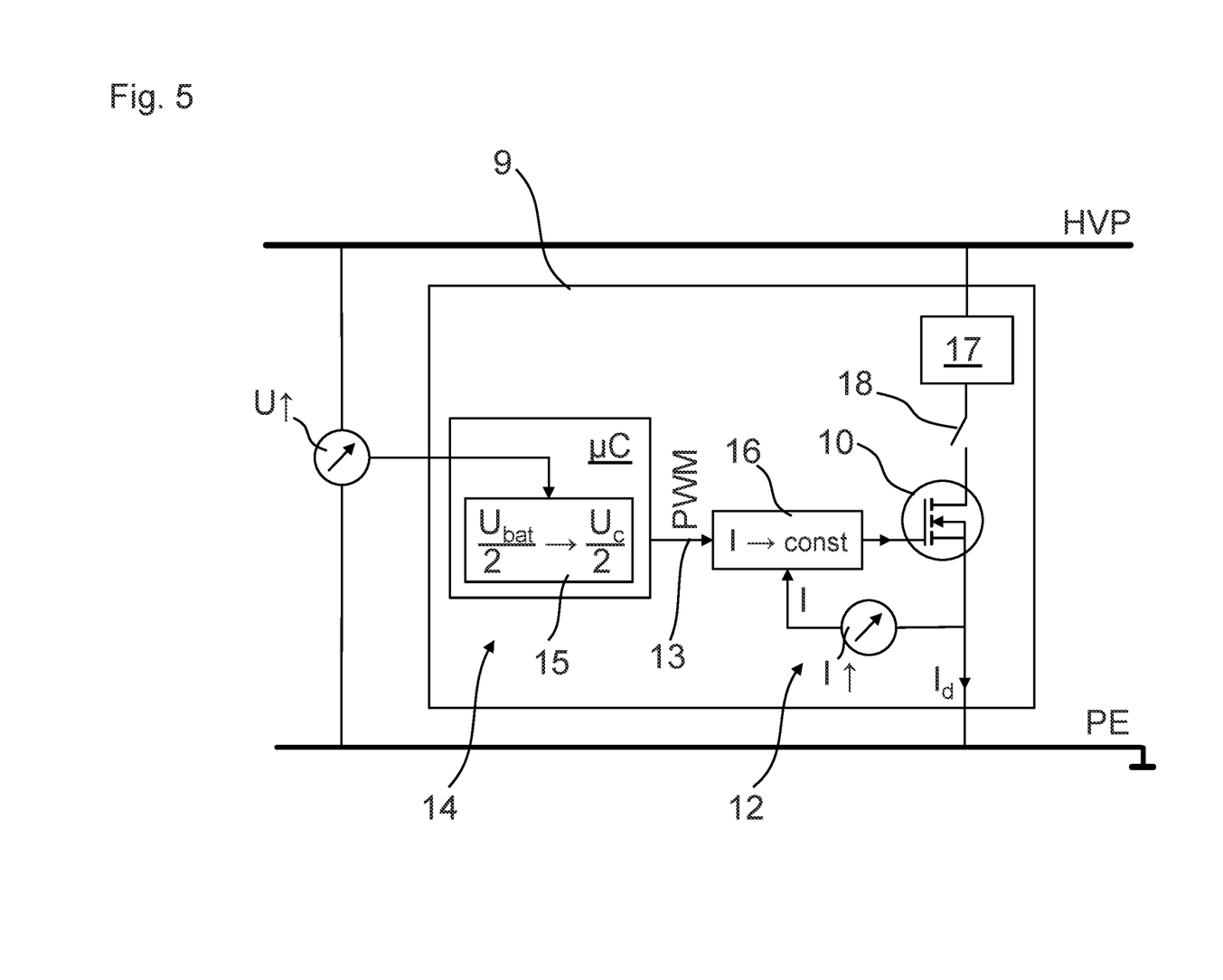
FIG. 5 illustrates a simplified diagram of a functional part of the charging device of FIG. 1 in more detail.

FIG. 5 illustrates a simplified diagram of a main functional part 9 of the charging device 1 of FIG. 1 in more detail.

The functional part 9 is illustrated with a resistor symbol in FIG. 1 as it may be regarded having a resistive effect as will be elucidated in more detail in the following description.

In FIG. 5, functional part 9 of the charging device 1 is shown to comprise an electronic control unit, which, in the present case, is embodied as a microcontroller μC, however without necessarily being limited thereto. Other digital processing units may also be employed, e.g. a microprocessor, and the like.

The electronic control unit μC is configured to control a current drain device 10 to drain current $I_d$ between the first battery terminal HVP and the protective earth terminal PE. In the embodiment shown in FIGS. 1 and 5, the current drain device 10 is a transistor, without being limited thereto, for example, a 1500 V FET. In other words, after the first and second power input terminals 5, 6 have been connected to the respective first and second charging terminals HV+, HV− of the charging station 4 (cf. FIG. 1), the electronic control unit μC is configured to drain current $I_d$ such that the DC voltage between the first battery terminal HVP and the protective earth terminal PE essentially matches with the DC voltage between the first charging terminal HV+ and the protective earth terminal PE of the charging station 4 while the DC/DC boost converter 8 boosts the voltage at the second charging terminal 6 by $U_{boost}$=400 V in the shown case before the output boosted DC voltage is fed to the second battery terminal HVN.

The combination of draining the current $I_d$ and boosting the charging voltage $U_c$ to match the nominal battery voltage $U_{bat}$ establishes a PE symmetry in spite of the difference in voltages between the charging station 4 and the high-voltage battery 3. Thus, a slow rise of the charging current can be ensured after electrically connecting the high-voltage battery 3 to the charging station 4 and starting the charging procedure.

Figure 2:
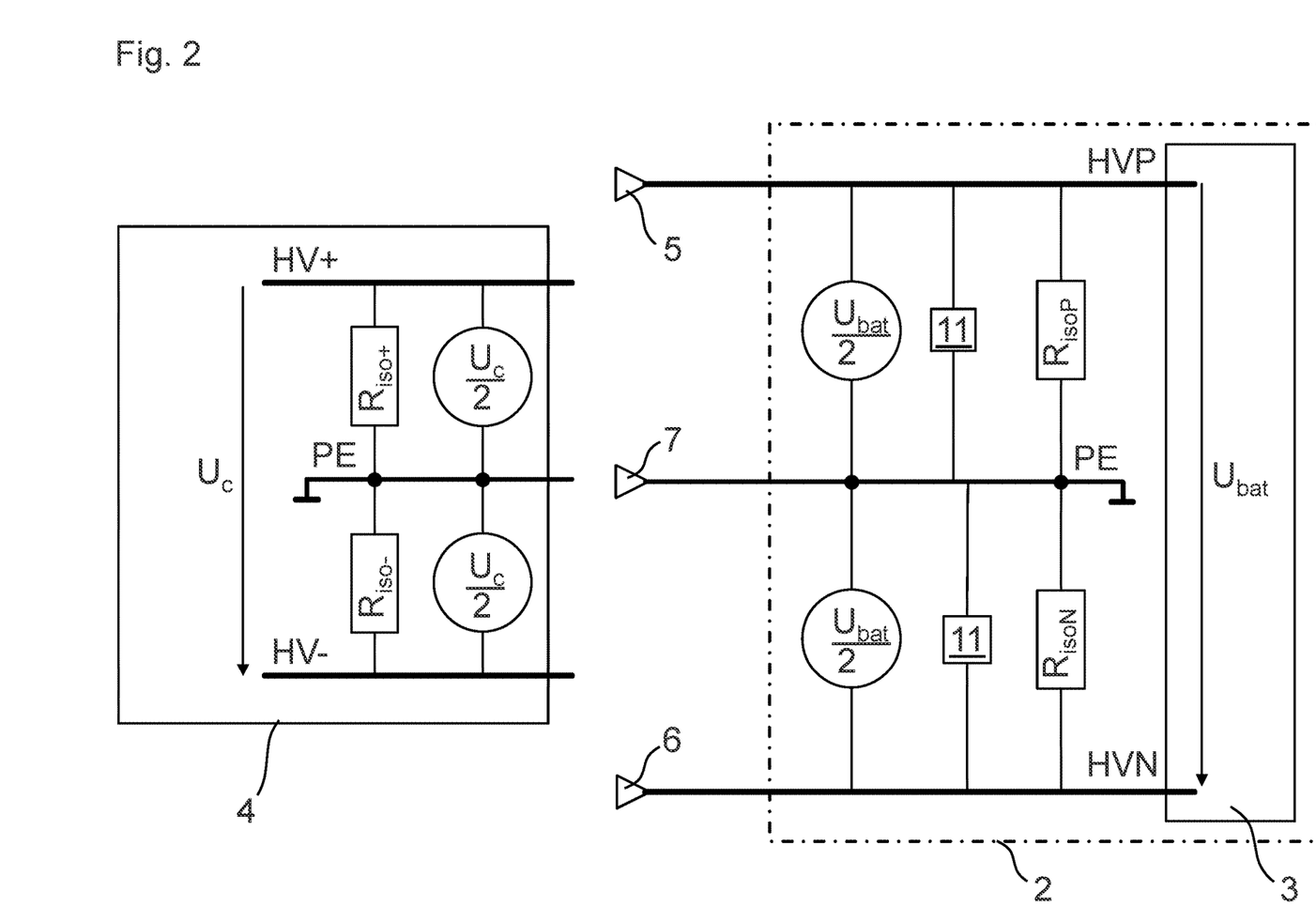
FIG. 2 illustrates a simplified diagram of a first operation phase to charge the high-voltage battery of the electric vehicle shown in FIG. 1 via the charging device shown in FIG. 1 employing an exemplary embodiment of a method according to the invention.
Figure 3:
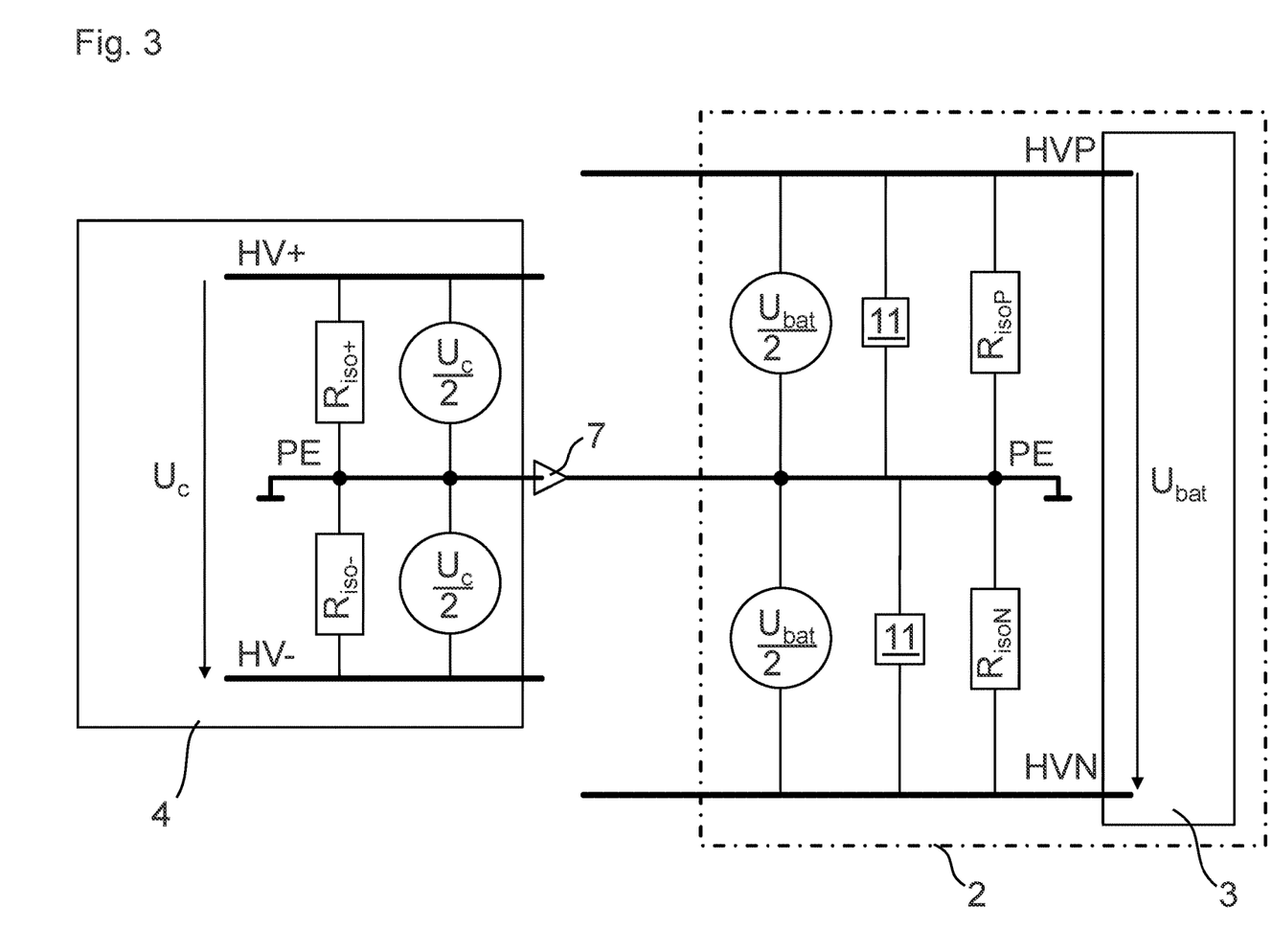
FIG. 3 illustrates a simplified diagram of a second operation phase to charge the high-voltage battery of the electric vehicle shown in FIG. 1 via the charging device also shown in FIG. 1 employing an exemplary embodiment of a method according to the invention.
Figure 4:
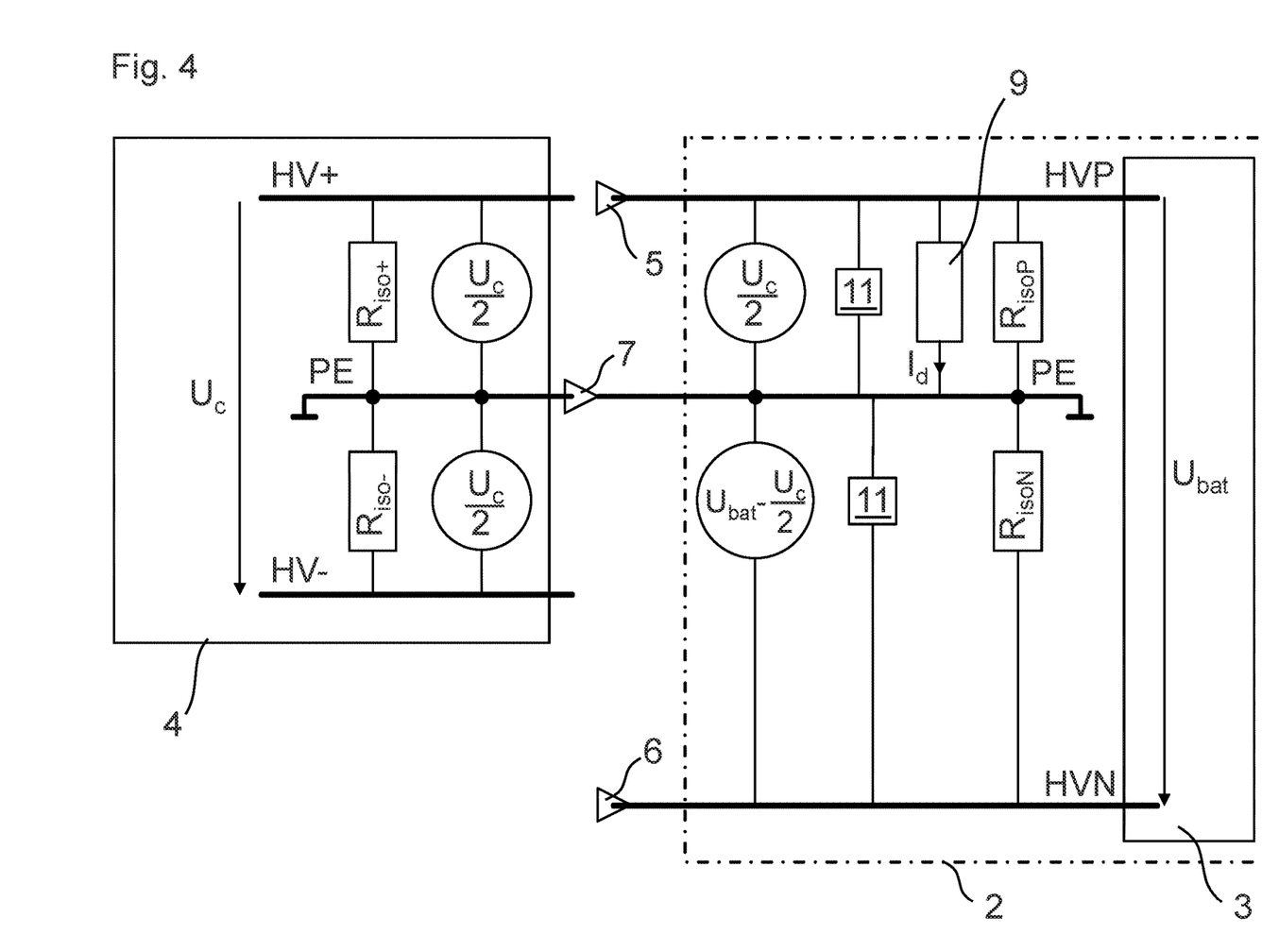
FIG. 4 illustrates a simplified diagram of a third operation phase to charge the high-voltage battery of the electric vehicle shown in FIG. 1 via the charging device also shown in FIG. 1 employing an exemplary embodiment of a method according to the invention.

FIGS. 2 to 4 will now be described to further explain individual steps carried out by an exemplar embodiment of the method according to the invention.

FIG. 2 illustrates a simplified diagram of a first operation phase to charge the high-voltage battery 3 of the electric vehicle 2 shown in FIG. 1 via the charging device 1 also shown in FIG. 1.

FIG. 3 illustrates a simplified diagram of a second operation phase to charge the high-voltage battery 3 of the electric vehicle 2 shown in FIG. 1 via the charging device 1.

FIG. 4 illustrates a simplified diagram of a third operation phase to charge the high-voltage battery 3 of the electric vehicle 2 shown in FIG. 1 via the charging device 1.

For safety reasons, in high-voltage networks such as the network temporarily formed by the charging station 4 and the high-voltage battery 3 during charging as shown in FIG. 1, insulation monitoring devices 11 or so-called "ISO guards" are commonly used for measuring an insulation resistances $R_{isoP}$, $R_{isoN}$ between PE (protective earth) and the high-voltage cables transferring the electric power from the first and second charging terminals HV+, HV− to the respective first and second battery terminals HVP, HVN. Then, if the determined insulation resistances $R_{isoP}$, $R_{isoN}$ drop below predetermined resistance thresholds, a safety mechanism (not shown) is triggered to immediately interrupt the power transfer, for example, by opening a switch, relay, and the like.

It is to be understood that the insulation monitoring devices 11 may be components of the charging device 1. However, the invention is not necessarily limited thereto. The monitoring devices 11 may be components being provided outside the charging device 1, thus not being included in the charging device 1 itself.

FIG. 2 illustrates the situation before an electric connection is established between the charging station 4 and the electric vehicle 2 or the high-voltage battery 3, respectively. As an example, the charging voltage $U_c$ provided by the charging station 4 is 400 V, and the nominal battery voltage $U_{bat}$ is 800 V, i.e. the charging voltage $U_c$ is significantly smaller than the nominal battery voltage $U_{bat}$. It is to be understood that charging voltages $U_c$ and/or battery voltages $U_{bat}$ other than 400 V and 800 V, respectively, may be used with the invention as well. The invention generally solves the problems which go along with charging a high-voltage battery at a charging station, wherein the charging voltage $U_c$ is smaller than the battery voltage $U_{bat}$.

As shown in FIG. 2, on the battery-side the first and second battery terminals HVP, HVN each are referenced to the battery-side protective earth PE, thus dividing the overall battery voltage $U_{bat}$ symmetrically between each high-voltage side HVP, HVN and PE to $U_{bat}/2$ as indicated in FIG. 2.

Analogously, on the charging station-side, the first and second high-voltage charging terminals HV+ and HV−, respectively, are also referenced to the charging station-side PE, thus likewise symmetrically dividing the charging voltage $U_c$ between each high-voltage side HV+, HV− and PE to $U_c/2$ as also indicated in FIG. 2.

Insulation resistances $R_{isoP}$, $R_{isoN}$ on the battery-side being operative between each of the battery-side high-voltage terminals HVP, HVN and PE as well as insulation resistances $R_{iso+}$, $R_{iso-}$ on the charging station-side being operative between each of the charging station high-voltage terminals HV+, HV− are also indicated in FIG. 2. The respective insulation resistances are monitored by the insulation monitoring devices 11 provided on the battery-side in FIG. 2 in the illustrated case. Although not shown in FIG. 2, it is to be understood, that similar insulation monitoring devices may be present on the charging station-side as well, however, without being necessarily limited thereto.

In FIG. 3, the charging station 4 and the electric vehicle 2 are electrically connected via their protective earth terminals PE to form a common protective earth PE. In this situation, $U_{bat}/2$ is still significantly higher than $U_c/2$.

In FIG. 4, draining current $I_d$ between the first battery terminal HVP and the protective earth terminal PE is performed by the functional part 9 of the charging device 1 shown in FIG. 1. The current $I_d$ is drained such that the DC voltage between the first battery terminal HVP and PE essentially matches with the DC voltage between the first charging terminal HV+ and PE, i.e. the voltage between HVP and PE essentially equals $U_c/2$ on the charging station-side as indicated in FIG. 4. The DC voltage between the second battery terminal HVN and PE is $U_{bat}-U_c/2$ in this situation.

Next, after also electrically connecting the charging station high-voltage terminals HV+ and HV− with the respective terminals 5 and 6, respectively, the DC/DC boost converter 8 is activated to boost the voltage at the second charging terminal HV− to match the DC charging voltage $U_c$ of the charging station 4 with the nominal battery voltage $U_{bat}$ of the high-voltage battery 3. Then, the boosted DC voltage output by the DC/DC boost converter 8 is fed to the second battery terminal HVN. This situation is shown in FIG. 1.

From FIGS. 2 to 4 it is apparent that, without draining the current $I_d$ according to the invention as shown in FIGS. 1 and 4, an asymmetry, i.e. a shift of electrical potential, between the high-voltage sides HV+ and HVP with regard to PE would result in high transient currents to occur between the charging station 4 and the high-voltage battery 3 immediately after establishing electrical connection therebetween, i.e. activating the charging procedure. This shift may cause an insulation voltage between the high voltage terminals and PE to be exceeded. Additionally, the insulation monitoring device 11 (e.g. ISO guard) would determine/calculate a wrong insulation resistance $R_{isoP}$, $R_{isoN}$. In consequence, the ISO guard(s) 11 would interpret the high current increase as a faulty insulation resistance $R_{isoP}$, $R_{isoN}$ and would stop the charging process instantly.

The invention disclosed herein effectively avoids such conditions, thus facilitating reliable, safe, and efficient charging of the high-voltage battery 3 at the charging station 4 which provides the charging voltage $U_c$ smaller than the nominal voltage $U_{bat}$ of the high-voltage battery 3. This significantly increases the possibilities of charging the electric vehicle 2 at many different charging stations.

With regard to FIG. 5, in order to drain the current $I_d$ such that the voltage between HVP and PE essentially equals $U_c/2$, the current drain device 10, i.e. the transistor (FET) in the present case, is operated in its linear operation mode. To this end, the current drain device 10 forms part of an analog current control loop 12 which is controlled by a setpoint current signal 13 which, in turn, is provided by a voltage control loop 14. A process value 15 to be controlled by the voltage control loop 14 is a voltage difference between the voltage between the first battery terminal HVP and the protective earth terminal PE and the voltage between the first charging terminal HV+ and the protective earth terminal PE. Preferably, the voltage difference, i.e. the process value 15, is controlled by the voltage control loop 14 to be essentially zero, i.e. the voltage difference between HVP and PE which is $U_{bat}/2$ before starting the current drain, will be controlled during the current drain to eventually attain $U_c/2$.

According to the setpoint current signal 13, the current control loop 12 controls the current $I_d$ to be essentially constant, i.e. a process value 16 to be controlled by the current control loop 12 is the drain current $I_d$ to equal the current indicated by the setpoint current signal 13.

In order to conduct the respective controls, the current control loop 12 and the voltage control loop 14 comprise current sensing means I↑ and voltage sensing means U↑, respectively, as indicated in FIG. 5.

Furthermore, to limit the drained current $I_d$, it may be conducted through a resistance network 17. The resistance network 17 may be connected in series with the current drain device 10 as shown in the example of FIG. 5.

Additionally, a controllable switching element 18, e.g. a relay, may be provided between the current drain device 10 and the first battery terminal HVP to selectively isolate the current drain device 10 from the first battery terminal HVP galvanically. In the example shown in FIG. 5, the switching element 18 is interposed between the transistor 10 and the resistance network 17.

As further shown in FIG. 5, the current control loop 12 is embodied in hardware only (i.e. essentially comprising the transistor 10, the current sensing means I↑, and an operational amplifier (not shown) to compare the input setpoint current signal 13 with the current feedback signal I), whereas the voltage control loop 14 is embodied as software executed by the digital processing unit, i.e. the microcontroller μC in the present case.

Moreover, in the exemplary charging device 1, the microcontroller μC is configured to generate the setpoint current signal 13 as a pulse width modulated (PWM) signal.

Still further, in the present embodiment of the charging device 1, the voltage control loop 14 is switchable between a high-dynamic operation mode and a low-dynamic operation mode, wherein the high-dynamic operation mode is selected during a first period of a transient activation operation after electrically connecting the first and second charging terminals HV+, HV− to the respective first and second battery terminals HVP, HVN, and immediately after starting to charge the battery 3. The low-dynamic operation mode is preferably selected after essentially reaching a steady state of the voltage between HVP and PE (i.e. having a value equal to $U_c/2$).

As already described herein, the insulation resistance $R_{isoP}$ is continuously measured by the insulation monitoring device 11 (cf. FIG. 1). Charging the high-voltage battery 3 is interrupted instantly when the measured insulation resistance $R_{isoP}$ drops below a predetermined insulation resistance threshold.

Advantageously, the measured insulation resistance $R_{isoP}$ between the first battery terminal HVP and PE may be used (not shown) by the voltage control loop 14 to determine the voltage difference between HVP and PE to be controlled. Thus, an additional voltage determining means UT is not necessary and may be omitted.

Furthermore, the voltages between each of the first and second battery terminals HVP, HVN and the protective earth terminal PE may be continuously measured/monitored on the boosted voltage side (i.e. on the output-side of the DC/DC boost converter 8), wherein the setpoint current signal 13 may be generated additionally as a function of the measured voltages such that the measured voltages always stay below respectively predetermined insulation-damaging voltage thresholds in order to further increase safety of the charging device 1.

Figure 6:
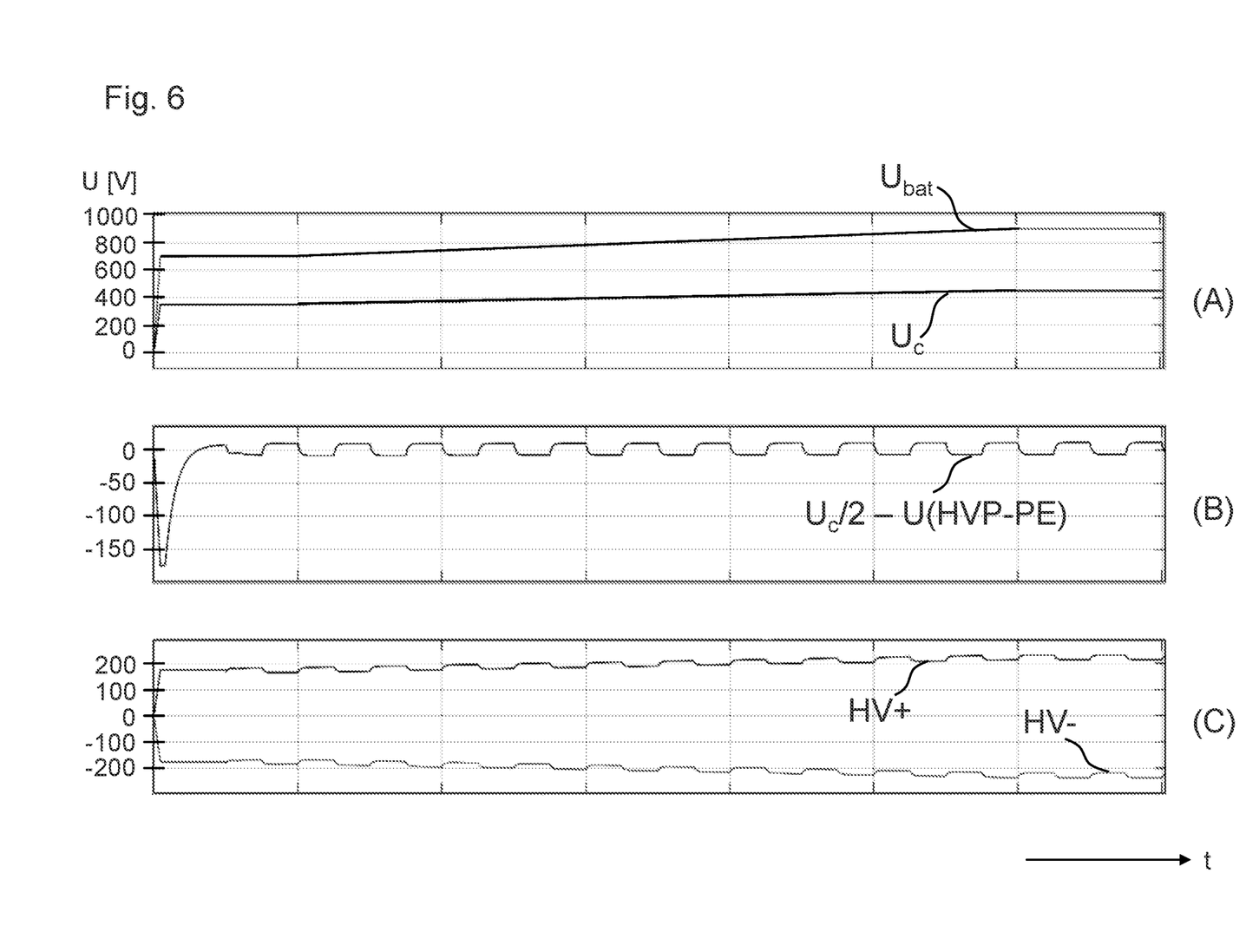
FIG. 6 illustrates different voltage curves in views A, B, and C, respectively, while conducting an exemplary embodiment of the method according to the invention.

FIG. 6 illustrates different voltage curves in views A, B, and C, respectively, while conducting exemplary embodiments of the method according to the invention.

In FIG. 6A, the upper curve indicates the battery voltage $U_{bat}$, and the lower curve indicates the charging voltage $U_c$ provided by the charging station 4 during charging the high-voltage battery 3. It can be observed that the charging voltage $U_c$ rises slowly along with a rise of the battery voltage $U_{bat}$ while the battery is charging.

In FIG. 6B, the error voltage signal of the voltage control loop 14, i.e. the difference between the voltage between the first battery terminal HVP and PE and the voltage between the first charging terminal HV+ and PE, is illustrated during charging the battery 3. After a highly transient behavior in the beginning of the charging process (large negative drop of the error signal curve), a steady state (i.e. the error signal is essentially zero) is reached and maintained during the rest of the charging period.

It is particularly preferred that during the transient state the high-dynamic operation mode of the voltage control loop 14 is selected, and during the steady state the low-dynamic operation mode of the voltage control loop 14 is selected.

In FIG. 6C, the upper curve indicates the voltage between the first high-voltage side HV+ of the charging station 4 and PE, and the lower curve indicates the voltage between PE and the second high-voltage side HV− of the charging station 4.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

REFERENCE SIGNS

1 Charging device
2 Electric vehicle
3 High-voltage battery
4 Charging station
5 First power input terminal
6 Second power input terminal
7 Protective earth terminal
8 DC/DC boost/step-up converter
9 Functional part
10 Current drain device
11 Insulation monitoring device
12 Current control loop
13 Setpoint current signal
14 Voltage control loop
15 Process value of voltage control loop
16 Process value of current control loop
17 Resistance network
18 Switching element
HV+ Positive high-voltage side at charging station
HV− Negative high-voltage side at charging station
HVP Positive high-voltage side at high-voltage battery
HVN Negative high-voltage side at high-voltage battery
I↑ Current sensing means
$I_d$ Drained electric current
μC Digital processing unit/Microcontroller
PE Protective earth
PWM Pulse width modulation
$R_{iso+}$ Insulation resistance between HV+ and PE
$R_{iso-}$ Insulation resistance between HV− and PE
$R_{isoP}$ Insulation resistance between HVP and PE
$R_{isoN}$ Insulation resistance between HVN and PE
U Voltage
U↑ Voltage sensing means
$U_{bat}$ Nominal battery voltage
$U_{boost}$ Step-up voltage
$U_c$ Charging voltage

The invention claimed is:

1. A method for charging a high-voltage battery of an electric vehicle, comprising:
   providing the high-voltage battery having a nominal battery voltage between first and second battery terminals,
   providing a charging station outputting a DC charging voltage between first and second charging terminals, wherein the DC charging voltage is less than the nominal battery voltage of the high-voltage battery,
   electrically connecting a charging station-side protective earth terminal to a battery-side protective earth terminal, and
   electrically connecting the first and second charging terminals to the respective first and second battery terminals while
   (i) draining current between the first battery terminal and the battery-side protective earth terminal such that a DC voltage between the first battery terminal and the battery-side protective earth terminal essentially matches with a DC voltage between the first charging terminal and the charging station-side protective earth terminal, and (ii) boosting a voltage at the second charging terminal to match the DC charging voltage of the charging station with the nominal battery voltage of the high-voltage battery, and feeding a boosted DC voltage to the second battery terminal.

2. The method as claimed in claim 1, wherein draining the current comprises operating a transistor in its linear operation mode as a current drain.

3. The method as claimed in claim 1, wherein draining the current comprises conducting the drained current through a resistance network.

4. The method as claimed in claim 1, wherein draining the current may be selectively interrupted galvanically.

5. The method as claimed in claim 1, wherein draining the current is conducted by an analog current control loop which is controlled by a setpoint current signal provided by a voltage control loop, wherein a process value to be controlled by the voltage control loop is a voltage difference between the voltage between the first battery terminal and the battery-side protective earth terminal and the voltage between the first charging terminal and the charging station-side protective earth terminal.

6. The method as claimed in claim 5, wherein the voltage difference is controlled by the voltage control loop to be essentially zero.

7. The method as claimed in claim 5, wherein the setpoint current signal is provided as a pulse width modulated (PWM) signal.

8. The method as claimed in claim 7, wherein the pulse width modulated signal is generated by a digital processing unit.

9. The method as claimed in claim 5, wherein the voltage control loop is implemented by a digital processing unit.

10. The method as claimed in claim 5, wherein the voltage control loop is configured to be switched between a high-dynamic operation mode and a low-dynamic operation mode, wherein the high-dynamic operation mode is preferably selected during a first period of a transient activation operation after electrically connecting the first and second charging terminals to the respective first and second battery terminals, and immediately after starting to charge the battery, and the low-dynamic operation mode is preferably selected after essentially reaching a steady state.

11. The method as claimed in claim 1, wherein an insulation resistance is continuously measured at least between the first battery terminal and the battery-side protective earth terminal, and optionally also between the second battery terminal and the battery-side protective earth terminal, wherein charging of the high-voltage battery is interrupted when the measured insulation resistance drops below a predetermined insulation resistance threshold.

12. The method as claimed in claim 5, wherein an insulation resistance is continuously measured between the first battery terminal and the battery-side protective earth terminal, wherein the measured insulation resistance between the first battery terminal and the battery-side protective earth terminal is used by the voltage control loop to determine the voltage difference to be controlled.

13. The method as claimed in claim 5, wherein the voltages between each of the first and second battery terminals and the battery-side protective earth terminal are continuously measured on the boosted voltage side, wherein the setpoint current signal is generated additionally as a function of the measured voltages such that the measured voltages always stay below respectively predetermined insulation-damaging voltage thresholds.

14. A charging device for charging a high-voltage battery of an electric vehicle at a charging station outputting a DC charging voltage between first and second charging terminals, wherein the DC charging voltage is less than a nominal battery voltage provided between first and second battery terminals of the high-voltage battery, the charging device comprising:
first and second power input terminals being electrically connectable to the respective first and second charging terminals of the charging station, wherein the first power input terminal is connected to the first battery terminal, and the second power input terminal is connected to the second battery terminal,
a protective earth terminal being electrically connectable to a charging station-side protective earth terminal,
a DC/DC boost converter interconnected in series between the second power input terminal and the second battery terminal, the DC/DC boost converter being configured to boost the DC charging voltage to match with the nominal battery voltage, and
an electronic control unit configured to control a current drain device to drain current between the first battery terminal and the protective earth terminal,
wherein, after the first and second power input terminals have been connected to the respective first and second charging terminals of the charging station, the electronic control unit is configured to drain current such that a DC voltage between the first battery terminal and the protective earth terminal essentially matches with a DC voltage between the first charging terminal and the charging station-side protective earth terminal while the DC/DC boost converter boosts the DC charging voltage.

15. The charging device as claimed in claim 14, wherein the current drain device comprises a transistor being operated in its linear operation mode.

16. The charging device as claimed in claim 14, further comprising a resistance network connected in series with the current drain device.

17. The charging device as claimed in claim 14, further comprising a controllable switching element configured to selectively isolate the current drain device from the first battery terminal galvanically.

18. The charging device as claimed in claim 14, further comprising an analog current control loop controlling the current drain device as a function of a setpoint current signal provided by a voltage control loop, wherein a process value to be controlled by the voltage control loop is a voltage difference between the voltage between the first battery terminal and the protective earth terminal and the voltage between the first charging terminal and the charging station-side protective earth terminal.

19. The charging device as claimed in claim 18, wherein the voltage control loop is configured to control the voltage difference to be essentially zero.

20. The charging device as claimed in claim 18, wherein the control unit comprises a digital processing unit configured to generate a pulse width modulated signal as the setpoint current signal.

21. The charging device as claimed in claim 19, wherein the digital processing unit is configured to implement the voltage control loop.

22. The charging device as claimed in claim 18, wherein the voltage control loop is switchable between a high-dynamic operation mode and a low-dynamic operation mode, wherein the high-dynamic operation mode is selected during a first period of a transient activation operation after electrically connecting the first and second charging terminals to the respective first and second battery terminals, and immediately after starting to charge the battery, and the low-dynamic operation mode is preferably selected after essentially reaching a steady state.

23. The charging device as claimed in claim 14, further comprising at least one insulation monitoring device configured to continuously measure an insulation resistance between the first battery terminal and the protective earth terminal, and optionally also comprising another insulation monitoring device configured to measure an insulation resistance between the second battery terminal and the protective earth terminal, wherein charging of the high-voltage battery is interrupted when the measured insulation resistance(s) drop(s) below a respective predetermined insulation resistance threshold.

24. An electric vehicle having a high-voltage battery, comprising a charging device for charging the high-voltage battery at a charging station outputting a DC charging voltage between first and second charging terminals, wherein the DC charging voltage is less than a nominal battery voltage provided between first and second battery terminals of the high-voltage battery, the charging device comprising:
   first and second power input terminals being electrically connectable to the respective first and second charging terminals of the charging station, wherein the first power input terminal is connected to the first battery terminal, and the second power input terminal is connected to the second battery terminal,
   a protective earth terminal being electrically connectable to a charging station-side protective earth terminal,
   a DC/DC boost converter interconnected in series between the second power input terminal and the second battery terminal, the DC/DC boost converter being configured to boost the DC charging voltage to match with the nominal battery voltage, and
   an electronic control unit configured to control a current drain device to drain current between the first battery terminal and the protective earth terminal,
   wherein, after the first and second power input terminals have been connected to the respective first and second charging terminals of the charging station, the electronic control unit is configured to drain current such that a DC voltage between the first battery terminal and the protective earth terminal essentially matches with a DC voltage between the first charging terminal and the charging station-side protective earth terminal while the DC/DC boost converter boosts the DC charging voltage.

* * * * *